United States Patent
Logan, Jr. et al.

(10) Patent No.: US 9,821,696 B1
(45) Date of Patent: Nov. 21, 2017

(54) INTEGRATED ASSIST HANDLE

(71) Applicant: GM GLOBAL TECHNOLOGY OPERATIONS LLC, Detroit, MI (US)

(72) Inventors: James Logan, Jr., South Lyon, MI (US); Richard J. Lange, Troy, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 15/145,909

(22) Filed: May 4, 2016

(51) Int. Cl.
*B60N 3/02* (2006.01)
*E05B 85/10* (2014.01)
*E05B 83/36* (2014.01)
*B60J 5/04* (2006.01)

(52) U.S. Cl.
CPC .......... *B60N 3/023* (2013.01); *B60J 5/0493* (2013.01); *E05B 83/36* (2013.01); *E05B 85/10* (2013.01)

(58) Field of Classification Search
CPC ........ B60N 3/023; E05B 85/107; E05B 83/36
USPC ........................................................ 296/1.02
See application file for complete search history.

(56) References Cited

U.S. PATENT DOCUMENTS

| | | | | |
|---|---|---|---|---|
| 5,090,877 A | * | 2/1992 | D'Silva | E05B 17/0058 417/474 |
| 6,371,549 B2 | * | 4/2002 | Kim | B60J 5/101 296/146.8 |
| 6,412,584 B1 | * | 7/2002 | Faigle | B60R 21/01 16/254 |
| 6,574,833 B1 | * | 6/2003 | Tomaiuolo | B60N 3/026 16/110.1 |
| 6,584,643 B1 | * | 7/2003 | Tomaiuolo | B60N 3/026 16/110.1 |
| 6,974,134 B1 | * | 12/2005 | Macri | B60N 3/023 16/412 |
| D600,626 S | * | 9/2009 | Miller | D12/400 |
| 7,744,141 B2 | * | 6/2010 | Saionji | B60N 3/023 16/429 |
| 9,022,445 B1 | * | 5/2015 | Duderstadt | B60N 3/023 296/1.02 |
| 9,296,323 B2 | * | 3/2016 | Voisin | B60N 3/02 |
| 2006/0143868 A1 | * | 7/2006 | Bauer | B60N 3/023 16/438 |
| 2017/0101043 A1 | * | 4/2017 | Lee | B60N 3/023 |

* cited by examiner

*Primary Examiner* — Pinel E Romain
(74) *Attorney, Agent, or Firm* — Quinn IP Law

(57) ABSTRACT

A door assembly includes a door frame, which generally defines a door opening. An assist handle is movably attached to the door frame. The assist handle is movable between a retracted position, proximal to the door frame, and a deployed position, distal from the door frame.

18 Claims, 3 Drawing Sheets

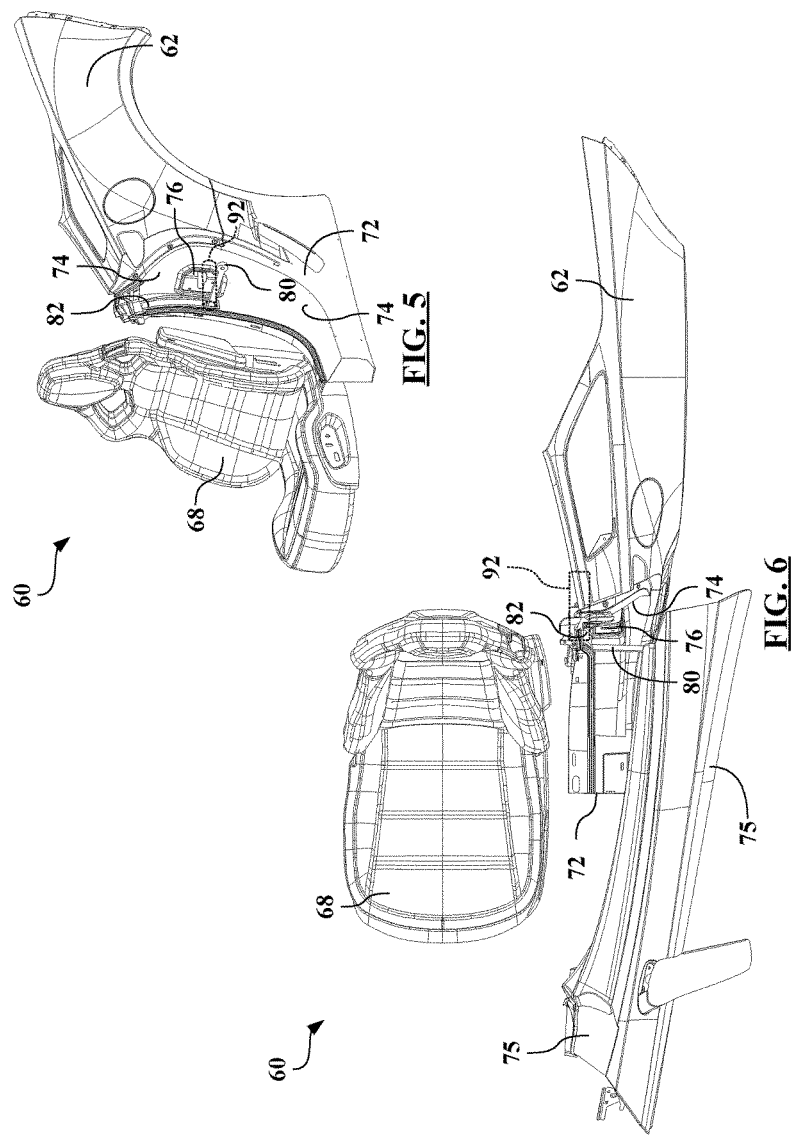

INTEGRATED ASSIST HANDLE

TECHNICAL FIELD

This disclosure generally relates to assist handles for door systems.

BACKGROUND

Door openings or doorways provide ingress or egress for occupants of vehicles or rooms. One or more doors are pivotally or movable attached to frames of the door openings, such that the doors are movable to block or allow access by stepping through the door openings or by sitting on seats within the vehicles or rooms.

SUMMARY

A door assembly is provided. The door assembly includes a door frame, which generally defines a door opening. An assist handle is movably attached to the door frame. The assist handle is movable between a retracted position, proximal to the door frame, and a deployed position, distal from the door frame. A hinge may attach the assist handle to the door frame and may define a first axis about which the assist handle rotates between the retracted position and the deployed position.

A method of operating a door mechanism or door assembly is also provided. The door mechanism includes a door frame defining a door opening and a door selectively movable relative to the door opening. The method includes adjusting a latch from a locked setting, which restrains the door in a closed position that blocks the door opening, to a free setting, which allows the door to move between the closed position and an open position that allows access to the door opening. The method also includes actuating an assist handle movably attached to the door frame opposite the pivot point of the door, such that the assist handle moves from a retracted position, proximal to the door frame, to a deployed position, distal from the door frame. The door moves from the closed position to the open position by actuation of the assist handle.

The above features and advantages, and other features and advantages, of the present subject matter are readily apparent from the following detailed description of some of the best modes and other embodiments for carrying out the disclosed structures, methods, or both.

BRIEF DESCRIPTION OF THE DRAWINGS

FIG. 5 is a schematic, isometric view of a portion of another vehicle, illustrating a seat accessible through a door assembly or mechanism having an integrated assist handle configured to partially open a door of the vehicle.

FIG. 6 is a schematic, top view of a portion of the vehicle of FIG. 5, illustrating the assist handle deployed to partially open the door of the vehicle.

DETAILED DESCRIPTION

Figure 1:
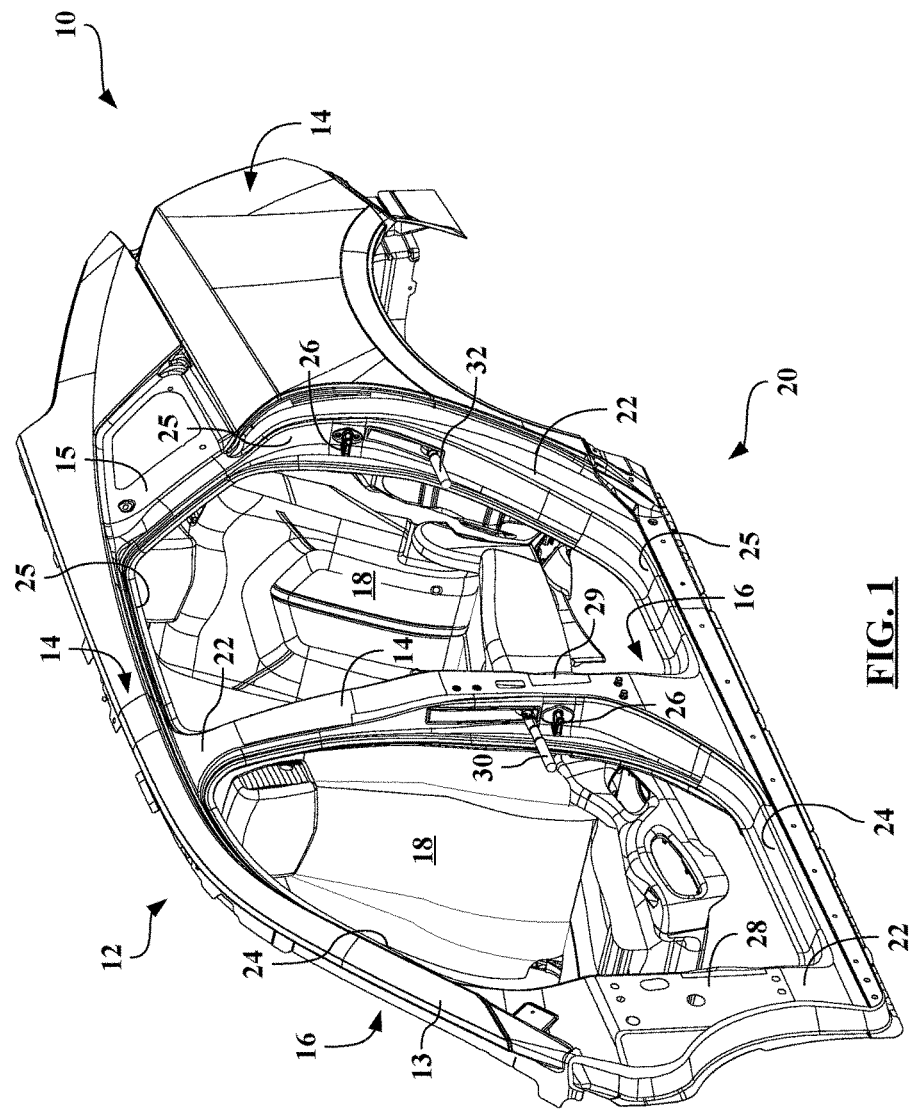
FIG. 1 is a schematic, isometric view of a portion of a vehicle or vehicle body, illustrating two interior seats accessible through a door assembly or mechanism having front and rear integrated assist handles.

Referring to the drawings, like reference numbers correspond to like or similar components whenever possible throughout the several figures. There is shown in FIG. 1 an isometric view of a vehicle 10, only a portion of which is illustrated.

A body 12, which may be part of a body-on-frame, unibody, monocoque, or other body construction, of the vehicle 10, includes an A-pillar 13, a B-pillar 14, and a C-pillar 15. The body 12 also generally defines an exterior 15 and an interior 17. As shown in FIG. 1 one or more seats 18 may be disposed with the interior 17 of the vehicle 10. The seat 18 may be referred to as a passenger seat and is representative of benches or other types of seats or chairs.

While the present disclosure may be described with respect to specific applications or industries, those skilled in the art will recognize the broader applicability of the disclosure. Those having ordinary skill in the art will recognize that terms such as "above," "below," "upward," "downward," et cetera, are used descriptively of the figures, and do not represent limitations on the scope of the disclosure, as defined by the appended claims. Any numerical designations, such as "first" or "second" are illustrative only and are not intended to limit the scope of the disclosure in any way.

Features shown in one figure may be combined with, substituted for, or modified by, features shown in any of the figures. Unless stated otherwise, no features, elements, or limitations are mutually exclusive of any other features, elements, or limitations. Furthermore, no features, elements, or limitations are absolutely required for operation. Any specific configurations shown in the figures are illustrative only and the specific configurations shown are not limiting of the claims or the description.

A door assembly 20 is illustrated on the vehicle 10. The door assembly includes a door frame 22 defining at least a front door opening 24 and a rear door opening 25. In the configuration shown in FIG. 1, there are both front and rear door openings 24. Alternatively stated, two door frames 22 may each define one of the front door opening 24 and the rear door opening 25. Note that the door frames 22 may be formed by portions of the A-pillar 13, B-pillar 14, and the C-pillar 15. As used herein, reference simply to the door opening 24 may be representative of either the front door opening 24 or the rear door opening 25.

A door (not shown in FIG. 1) is movable with respect to each of the door frames 22. The door selectively moves between a closed position, which fills or blocks the front door opening 24 or the rear door opening 25, and an open position, which allows access to the front door opening 24 or the rear door opening 25.

The vehicle 10 shown is an SUV or crossover passenger vehicle, but is representative of numerous types vehicles, including planes, trains, and automobiles. Additionally, heavy industrial, construction, and mining equipment may incorporate features of the vehicle 10 or the door assembly 20 described herein.

Additionally, the door assembly 20, and other features illustrated with respect to the vehicle 10, may also be usable with non-vehicular doors or hatches. Furthermore, although the door assembly 20 is illustrated with one or more seats 18 in the immediate vicinity, features of the door assembly 20 may also be usable with marine and aviation doors or hatches and with other doors or hatches, for example a rear lift gate or tail gate, that may not include a passenger seat in the immediate vicinity.

A portion of at least one latch 26 is illustrated in FIG. 1 with respect to both the front and rear door frames 22. In particular, the receptacle portion or latch pin, which cooperates with corresponding structures of the door, is viewable in the figures. As used herein, the latch 26 generally refers to the structures in the door and in the door frames 22 that allow or restrain movement of the door. In cooperation with the portions in the door, the latch 26 is selectively adjustable between a locked setting, which restrains the door in the closed position, and a free setting, which allows the door to move between the closed position and the open position.

The terms front and rear, as used herein as descriptors or as directions, refer to the typical direction of travel of the vehicle 10 into which the door assembly 20 is incorporated. Note that the doors of the vehicle 10 shown are configured to be hinged or attached toward the front of the front door opening 24 and the rear door opening 25, such that the latches 26 are toward the rearward side of the front door opening 24 and the rear door opening 25, but may alternatively be hinged elsewhere. The latch 26 is representative of numerous elements or mechanisms used to allow selective restraint of the door in the closed position, the open position, or both.

As shown in FIG. 1, an assist handle 30 is attached to the door frame 22. In this example, the assist handle 30 is attached to the B-pillar 14. The assist handle 30 is movably or pivotally attached, such that the assist handle 30 selectively moves between a retracted position, proximal to the door frame 22, and at least one deployed position, distal from the door frame 22. The assist handle 30 is permanently or fixedly attached to the door frame 22, such that it is not readily removable and does not require separate stowage elsewhere within the vehicle 10. FIG. 1 illustrates the assist handle 30 in one of the deployed positions, which may be considered an initially deployed or first deployed position.

As shown in FIG. 1, the door assembly 20 also includes a rear assist handle 32 that is pivotally attached to the rear door frame 22. In this example, the rear assist handle 32 is attached to the C-pillar 15 The rear assist handle 32 is also selectively movable between a retracted position, proximal to the door frame 22, and at least one deployed position, distal from the door frame 22. The retracted position (not shown) of the rear assist handle 32 is substantially disposed or stowed within the door frame 22, such that movement of the door is generally unaffected by the rear assist handle 32, when retracted.

During ingress or egress of occupants of the vehicle 10, the assist handle 30, the rear assist handle 32, or both, may be deployed to provide a point of leverage. For example, an occupant of the front seat 18 may grab the assist handle 30 to provide leverage as he or she steps away from the front seat 18 onto the ground below, which may lessen the difficulty of, or impact caused by, such movement. Similarly, smaller occupants entering (or exiting) the rear seat 18 may benefit from the additional point of leverage provided by the rear assist handle 32.

The latch 26, the assist handle 30, and the rear assist handle 32 are all illustrated as located opposite a front attachment point 28 and a rear attachment point 29 (approximate locations of which are show) of the respective doors, likely via one or more hinges. The front attachment point 28 and the rear attachment point 29 are shown at the forward edge of the door opening 24 and the assist handles are located at the rearward edge of the door opening 24. With a rearward opening door, the latch 26, the assist handle 30, and the rear assist handle 32 may be located at the forward edge of the door opening 24. However, the locations of the assist handles are not limited to being opposite the any attachment points for the doors, depending on the needs of a particular application.

Figure 4:
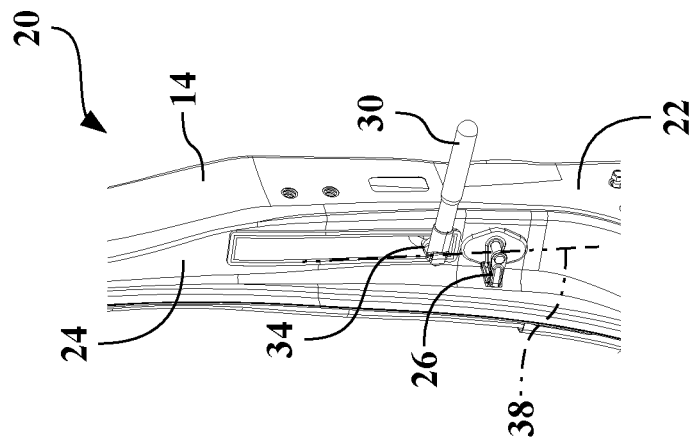
FIG. 4 is a schematic, isometric, detail view of the front assist handle of FIG. 1, shown in a fully deployed position, such that the assist handle is substantially perpendicular to the door opening.
Figure 3:
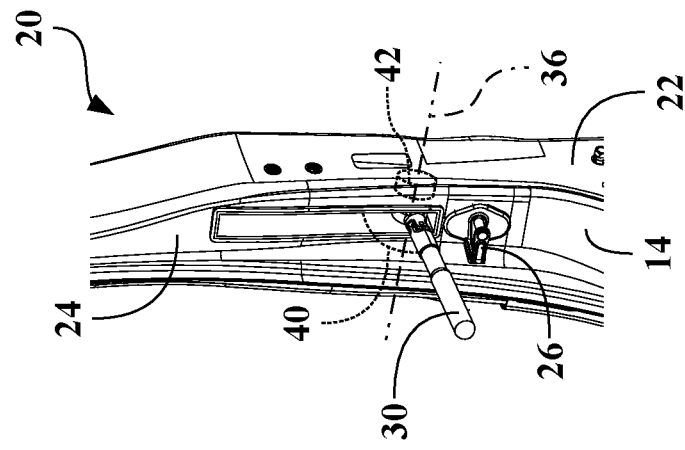
FIG. 3 is a schematic, isometric, detail view of the front assist handle of FIG. 1, shown in an initially deployed position, such that the assist handle is substantially within a door opening.
Figure 2:
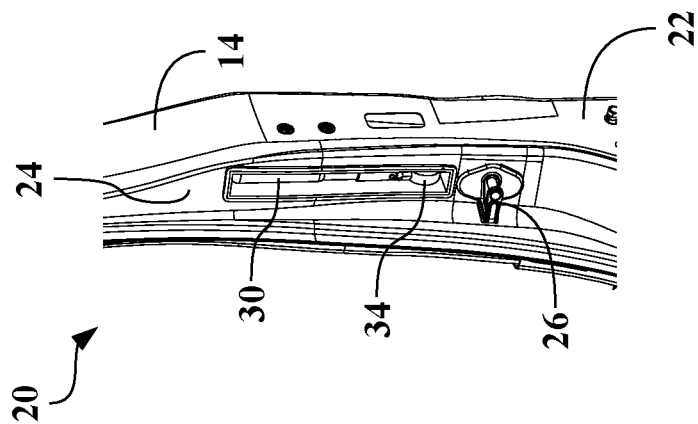
FIG. 2 is a schematic, isometric, detail view of the front assist handle of FIG. 1, shown in a retracted position.

Referring also to FIGS. 2-4, there are shown additional views of the door assembly 20 that better illustrate the assist handle 30 in various positions. FIG. 2 shows a detail view of the assist handle 30 in the B-pillar 14 illustrated in its stowed or retracted position. FIG. 3 shows a detail view of the assist handle 30 in the B-pillar 14 in its initially deployed position, which is also shown in FIG. 1. FIG. 4 shows a detail view of the assist handle 30 in the B-pillar 14 in a fully deployed position.

The retracted position shown in FIG. 2 is completely stowed within the door frame 22 and withdrawn from the door opening 24, such that the door opens and closes without being affected by the assist handle 30 when in the retraced position. This may allow a vehicle without the assist handle 30 to be manufactured with a substantially identical door as used for the vehicle 10. Alternatively, the assist handle 30 may partially extend or protrude into the door opening 24 when in the retracted position. In such a configuration, the door may have a cavity or recession to accommodate the volume of the door opening 24 occupied by the assist handle 30.

In the configuration of the door assembly 20 illustrated in FIGS. 2-4, a hinge 34 attaches the assist handle 30 to the door frame 22. The hinge 34 defines a first axis 36, about which the assist handle 30 rotates between the retracted position (shown in FIG. 2) and at least the initially deployed position (shown in FIG. 3).

The first axis 36 shown is generally perpendicular to the door opening 24, such that the assist handle 30 rotates or moves into the door opening 24 when moving to the initially deployed position. However, the assist handle 30 may rotate about other orientations of the first axis 36. For example, the first axis 36 may alternatively be aligned at approximately a forty-five degree angle to the door opening 24, such that the assist handle 30 deploys at an angle between the initially deployed position shown in FIG. 3 and the fully deployed position shown in FIG. 4.

In the configuration shown, the assist handle 30 is movably attached to a rearward side of the door frame 22, relative to the forward direction of travel for the vehicle 10. Therefore, the assist handle 30 extends forward into the door opening 24 when moving from the retracted position to the initially deployed position.

As shown in FIG. 4, the hinge 34 also defines a second axis 38, which is substantially perpendicular to the first axis 36. Movement or rotation about the second axis 38 allows the second or fully deployed position. Therefore, as illustrated by FIGS. 3 and 4, the fully deployed position is substantially perpendicular to the door opening 24 and substantially perpendicular to the initially deployed position of the assist handle 30.

Note that the first axis 36 and the second axis 38 can be incorporated into a universal joint, as shown in FIGS. 2-4, but may also be defined by, for example and without limitation a ball joint or linkage. Additionally, the orientation of the first axis 36 and the second axis 38, relative to one another or to the door frame 22, is not limiting. Different angles of deployment, or a single deployment movement, may provide assistance to occupants of the vehicle 10. The rear assist handle 32, as shown in FIG. 1, may have only a single axis.

The assist handle 30 provides an integrated, retractable point of leverage for occupants entering or exiting the vehicle 10. Alternatively, a detachable handle (not shown) may be selectively attached to the door frame 22. However, because the detachable handle is not integrated with the door frame 22, it must be stowed elsewhere in the vehicle 10 when not in use and may be lost. Furthermore, unless special structures are incorporated into the door frame 22 to receive the detachable handle, it may deform portions of the door frame 22 or the latch 26.

As schematically illustrated in FIG. 3, the door assembly 20 includes a return mechanism 40 to bias the assist handle 30 toward the retracted position. When deployed, the assist handle 30 may interfere with moving the door to the closed position. Therefore, the return mechanism 40 may automatically, or in response to a signal, move the assist handle 30 to the retracted position.

For example, and without limitation, after the occupant of the vehicle 10 uses the assist handle 30, removal of the weight of the occupant may trigger the return mechanism 40 to stow the assist handle 30. The return mechanism 40 is illustrated only schematically in FIG. 3, but may be, without limitation: a linear or torsion spring, a bushing, a magnetic retractor, or a belt winder. Furthermore, the return mechanism 40 may be a powered device, such as an electric or servo motor.

As schematically illustrated in FIG. 3, the door assembly 20 includes a power actuator 42 operatively attached to the assist handle 30 and the door frame 22. The power actuator 42 is configured to move the assist handle 30 from the retracted position to at least one of the first deployed position and the second deployed position. The power actuator 42 may be triggered by opening of the door or by a signal, such as from a push button or a proximity sensor. Additionally, the functionality of the power actuator 42 and the return mechanism 40 may be incorporated into a single component or mechanism.

Referring also to FIGS. 5-6, and with continued reference to FIGS. 1-4, there are shown views of a portion of a vehicle 60, which is illustrated as a convertible automobile. FIG. 5 shows an isometric view of portions of the vehicle 60 and FIG. 6 shows a top view of the vehicle 60.

A body 62 of the vehicle 60 includes one or more seats 68 disposed within its interior. A door frame 72 of the body 62 defines a door opening 74. Note that the door opening 74 may also be partially defined by a roof of the convertible vehicle 60. A door 75, viewable only in FIG. 6, is attached and movable with respect to the door frame 72. A closed position of the door 75 blocks the door opening 74 and an open position of the door 75 allows access to the door opening 74. The door 75 is illustrated in FIG. 6 as slightly open, such that the door 75 has moved away from the door frame 72.

A latch 76 is selectively adjustable between a locked setting, which restrains the door 75 in the closed position, and a free setting, which allows the door 75 to move between the closed position and the open position. The latch 76 represents the necessary structures and components to restrain or allow movement of the door 75 relative to the door opening 74.

An assist handle 80 is movably attached to a rearward side of the door frame 72, opposite the attachment and pivot point of the door 75. The assist handle 80 is movable between a retracted position, proximal to the door frame 72, and a deployed position, distal from the door frame 72. The deployed position is illustrated in both FIGS. 5 and 6. The retracted position of the assist handle 80 is not shown, but the assist handle 80 is stowable within a cavity 82 of the door frame 72.

As illustrated in FIG. 6, for the assist handle 80 to be deployed, the door 75 should be in the open position. Therefore, operation of the latch 76 is either directly or indirectly coordinated with operation of the assist handle 80.

The assist handle 80 extends outward from the interior of the vehicle 60, such that its deployed position is generally perpendicular to the door opening 74. As an occupant enters or exits the vehicle 60, the occupant may use the assist handle 80 to provide leverage while moving between the seat 68 and the outside of the vehicle 60 (i.e., between standing and sitting).

The vehicle 60 may also include a power actuator 92 attached to the assist handle 80 and the door frame 72, which is shown schematically in FIGS. 5 and 6. The power actuator 92 moves the assist handle 80 from the retracted position to the deployed position. Additionally, the power actuator 92 may cause the assist handle 80 to move the door 75 from the closed position to the open position when the latch 76 is in free setting.

Therefore, the power actuator 92 and the assist handle 80 may partially open the door 75 to promote egress or ingress of occupants. For example, a push button or door handle (not shown) may trigger actuation of the latch 76, to release the door 75, and trigger the power actuator 92 to move the assist handle 80 to the deployed position, such that the assist handle 80 pushes the door 75 to the position shown in FIG. 6.

In the vehicle 60 shown, the door 75 pivots about the forward edge of the door frame 72, such that the door 75 is forward opening. The latch 76 and the assist handle 80 are disposed opposite the pivot point of the door 75. If the door 75 were rearward opening, the latch 76 and the assist handle 80 may be moved to the forward edge of the door frame 72, such that the power actuator 92 operates to push the door 75 open from the side opposite its pivot point. Alternatively, the assist handle 80 and the power actuator 92 may operate nearer the pivot point of the door 75. However, this may require more force or torque for the assist handle 80 to move the door 75 to its partially open position.

A method of operating a door mechanism, such as that incorporated into the vehicle 60, or the vehicle 10, may utilize the assist handle 80 and the power actuator 92 to partially open the door 75. This may be referred to as an easy-open or assist-open feature. The method may be controlled or executed by a control system with suitable memory, signal processing capability, and communication capability to instruct and effect operation.

The method may include adjusting the latch 76 from its locked setting, which would otherwise restrain the door 75, to its free setting, which allows the door 75 to move. The method may then actuate the assist handle 80, such as with the power actuator 92. The assist handle 80 moves from the retracted position, proximal to the door frame 72, to the deployed position, distal from the door frame 72. Actuation of the assist handle 80 moves the door 75 away from the closed position to the open position, such that it assists occupants by at least partially opening the door 75.

The detailed description and the drawings or figures are supportive and descriptive of the subject matter discussed herein. While some of the best modes and other embodiments for have been described in detail, various alternative designs, configurations, and embodiments exist.

The invention claimed is:

1. A door assembly, comprising:
   a door frame defining a door opening; and
   an assist handle movably attached to the door frame,
   wherein the assist handle is rotatable with respect to the door frame between a retracted position, proximal to the door frame, and a deployed position, distal from the door frame.

2. The door assembly of claim 1, further comprising:
   a hinge attaching the assist handle to the door frame, wherein the hinge defines a first axis, about which the assist handle rotates between the retracted position and the deployed position.

3. The door assembly of claim 2,
   wherein the deployed position is a first deployed position,
   wherein the assist handle is movably attached to a rearward side of the door frame, such that the assist handle extends forward into the door opening when moving from the retracted position to the deployed position,
   wherein the hinge defines a second axis, substantially perpendicular to the first axis, and
   wherein the assist handle is further movable to a second deployed position, rotated about the second axis, such that the second position is substantially perpendicular to the door opening.

4. The door assembly of claim 3, further comprising:
   a return mechanism biasing the assist handle toward the retracted position.

5. The door assembly of claim 4, further comprising:
   a power actuator attached to the assist handle and the door frame, wherein the power actuator is configured to actuate the assist handle from the retracted position to at least one of the first deployed position and the second deployed position.

6. The door assembly of claim 1, further comprising:
   a return mechanism biasing the assist handle toward the retracted position.

7. The door assembly of claim 2,
   wherein the deployed position is a first deployed position,
   wherein the assist handle is movably attached to a perimeter of the door frame and the assist handle extends into the door opening when moving from the retracted position to the deployed position,
   wherein the hinge defines a second axis, substantially perpendicular to the first axis, and
   wherein the assist handle is further movable to a second deployed position, rotated about the second axis, such that the second position is substantially perpendicular to the door opening.

8. The door assembly of claim 1, further comprising:
   a power actuator attached to the assist handle and the door frame, wherein the power actuator actuates the assist handle from the retracted position to the deployed position.

9. The door assembly of claim 8, further comprising:
   a door movable with respect to the door frame between a closed position, which blocks the door opening, and an open position, which allows access to the door opening; and
   a latch selectively adjustable between a locked setting, which restrains the door in the closed position, and a free setting, which allows the door to move between the closed position and the open position,
   wherein placing the latch in the free setting and actuating the assist handle, with the power actuator, from the retracted position to the deployed position moves the door from the closed position to the open position.

10. A vehicle, comprising:
    a door frame defining a door opening;
    a door movable with respect to the door frame between a closed position, which blocks the door opening, and an open position, which allows access to the door opening;
    an assist handle movably attached to the door frame opposite a pivot point of the door, wherein the assist handle is movable between a retracted position, proximal to the door frame, and a deployed position, distal from the door frame, when the door is in the open position;
    a latch selectively adjustable between a locked setting, which restrains the door in the closed position, and a free setting, which allows the door to move between the closed position and the open position; and
    a power actuator attached to the assist handle and the door frame, wherein the power actuator moves the assist handle from the retracted position to the deployed position, such that the assist handle moves the door from the closed position to the open position when the latch is in free setting.

11. The vehicle of claim 10, further comprising:
    a return mechanism biasing the assist handle toward the retracted position.

12. A method of operating a door mechanism having a door frame defining a door opening and a door selectively movable relative to the door opening, the method comprising:
    adjusting a latch from a locked setting, which restrains the door in a closed position that blocks the door opening, to a free setting, which allows the door to move between the closed position and an open position that allows access to the door opening;
    actuating an assist handle movably attached to the door frame opposite a pivot point of the door, such that the assist handle moves from a retracted position, proximal to the door frame, to a deployed position, distal from the door frame; and
    moving the door from the closed position to the open position with the assist handle.

13. The method of claim 12, wherein actuating the assist handle occurs via a power actuator attached to the assist handle and the door frame, such that the power actuator moves the assist handle from the retracted position to the deployed position and moves the door from the closed position to the open position.

14. The door assembly of claim 1, wherein the assist handle is within a cavity of the door frame when in the retracted position.

15. The door assembly of claim 14, wherein the assist handle is movably attached to a pillar, such that the retracted position is within a cavity of the pillar and the deployed position extends from the pillar.

16. The door assembly of claim 6, wherein the assist handle is within a cavity of the door frame when in the retracted position, such that the return mechanism biases the door handle toward the cavity.

17. The door assembly of claim 8, wherein the assist handle is within a cavity of the door frame when in the retracted position, such that the power actuator actuates the assist handle from the cavity to extend into the door opening when in the deployed position.

18. The door assembly of claim 9, wherein the assist handle is movably attached to a pillar, such that the retracted position is within a cavity of the pillar and the deployed position extends from the pillar.

* * * * *